US012472761B2

(12) United States Patent
Bicego

(10) Patent No.: US 12,472,761 B2
(45) Date of Patent: Nov. 18, 2025

(54) PRINTING SYSTEM

(71) Applicant: UTECO CONVERTING S.P.A., Colognola Ai Colli (IT)

(72) Inventor: Alessandro Bicego, San Giovanni Lupatoto (IT)

(73) Assignee: UTECO CONVERTING S.P.A., Colognola Ai Colli (IT)

( * ) Notice: Subject to any disclaimer, the term of this patent is extended or adjusted under 35 U.S.C. 154(b) by 0 days.

(21) Appl. No.: 18/373,656

(22) Filed: Sep. 27, 2023

(65) Prior Publication Data

US 2024/0100870 A1 Mar. 28, 2024

(30) Foreign Application Priority Data

Sep. 28, 2022 (IT) ........................ 102022000019905

(51) Int. Cl.

| | |
|---|---|
| ***B41F 3/52*** | (2006.01) |
| ***B41F 3/54*** | (2006.01) |
| ***B41F 5/24*** | (2006.01) |
| ***B41F 33/00*** | (2006.01) |
| ***B41M 1/04*** | (2006.01) |

(52) U.S. Cl.

CPC ................. *B41M 1/04* (2013.01); *B41F 3/52* (2013.01); *B41F 3/54* (2013.01); *B41F 5/24* (2013.01); *B41F 33/0036* (2013.01)

(58) Field of Classification Search

None

See application file for complete search history.

(56) References Cited

U.S. PATENT DOCUMENTS

| | | | | |
|---|---|---|---|---|
| 9,840,073 | B2 | 12/2017 | Ihme et al. | |
| 2008/0264283 | A1* | 10/2008 | Taig ........................ | B41F 13/10 101/375 |
| 2022/0128348 | A1 | 4/2022 | Schwab | |

FOREIGN PATENT DOCUMENTS

| | | | |
|---|---|---|---|
| DE | 19505971 | A1 | 8/1996 |
| EP | 2829403 | A2 | 1/2015 |
| EP | 3967495 | A1 | 3/2022 |
| IT | VR20120065 | A1 | 9/2013 |

OTHER PUBLICATIONS

Italian Search Report and Written Opinion dated Apr. 4, 2023 issued in IT 20220001905, with partial translation.

* cited by examiner

*Primary Examiner* — Joshua D Zimmerman

(74) *Attorney, Agent, or Firm* — Scully, Scott, Murphy & Presser, P.C.

(57) ABSTRACT

A printing system comprising a flexographic printing machine comprising at least one impression cylinder, on which the material in sheet form to be printed is wound and around which at least one printing station is arranged. Each printing station comprises a plate cylinder, which is provided with a graphic element, and an anilox roller. Downstream of each printing station there is at least one drying unit for the inks which emits at least one first air flow and aspirates at least one second air flow; there are also elements for acquiring a coverage value of the graphic element present on the plate cylinder of each printing station and elements for automatically adjusting a flow rate of the first air flow and of the second air flow as a function of the coverage value of the graphic element acquired by the acquisition elements.

11 Claims, 6 Drawing Sheets

PRINTING SYSTEM

The present invention relates to a printing system.

Printing systems comprising a rotary machine that allows to transfer inks onto a ribbon of material in sheet form to be printed are known.

In particular, rotary flexographic printing machines are known which have, in general, a supporting structure on which at least one impression cylinder is rotatably mounted on which the ribbon of material in sheet form to be printed is made to advance and around which at least one printing station, intended to apply ink to the material in sheet form, is arranged.

Flexographic printing machines are also known in which there is a single large impression cylinder, commonly termed central drum, around which multiple printing stations are distributed, each of which is meant to apply an ink of a respective color on the material in sheet form to be printed.

Each printing station comprises, in turn, a respective pair of printing cylinders, arranged so that their axes are substantially parallel to the impression cylinder.

In particular, such printing cylinders are constituted by a plate cylinder, which is intended to apply the ink onto the material in sheet form to be printed that passes on the impression cylinder, and a screen roller or anilox roller, which has the function of transferring the ink onto the plate cylinder.

More particularly, the plate cylinder is placed adjacent to the impression cylinder, so that it can come into contact with the material to be printed, and is provided in relief, on its lateral surface, with at least one printing region, which is shaped so as to correspond to the image to be printed and which constitutes the so-called "graphic element", while the anilox roller is laterally adjacent to the plate cylinder and placed in contact with it, so that the ink, drawn typically from a doctor-type inking assembly, can be transferred onto the plate cylinder.

On the basis of the graphic element provided on its lateral surface, the plate cylinder of each printing assembly transfers a given amount of ink onto the material in sheet form to be printed.

Normally, immediately downstream of each printing station along the direction of advancement of the ribbon of material in sheet form to be printed there is at least one respective ink drying unit, typically constituted by a drying box, which has the task of blowing hot air onto the printed material in sheet form to dry the inks by evaporating the solvent, in the case of solvent-based inks, or water, in the case of water-based inks.

The velocity of the air in output from the drying boxes can vary usually between 30 and 70 m/s, on the basis of the type of box and of the power of the air ventilation assembly to which they are connected.

The temperature of the air in output from the drying boxes can instead vary between room temperature up to even 120° C., depending on the material in sheet form to be printed.

In practice, each drying box allows to provide a first drying of the inks applied to the material in sheet form in order to avoid soiling the plate cylinder of the next printing station.

In detail, each drying box is provided with first openings, which allow to blow air onto the printed material in sheet form and which are connected to an air intake or delivery duct, and with second openings, which are in turn connected to an air output or return duct and allow to extract the blown air and the evaporated solvents.

The delivery and return ducts of the drying boxes must be structured so as to ensure that the inks applied to the material in sheet form are adequately dried and all the blown air and the evaporated solvents are properly extracted, while at the same time preventing the ink from drying on the plate cylinder and the creation of an explosive atmosphere at the printing stations.

For this purpose, the delivery duct and the return duct of the drying boxes are each provided with a respective flow control element, which allows to vary the passage section of the air through the corresponding duct, so that the corresponding drying box can create a negative pressure, with respect to atmospheric pressure, on the printed material in sheet form.

To date, the adjustment of the flow control elements of the delivery duct and of the return duct of the drying boxes is performed manually by an expert operator once and for all, during the installation of the machine, with the consequence that each of the drying boxes always emits and draws the same flow rate of hot air through the corresponding openings, regardless of the image to be printed in each instance.

This fact leads to high energy consumption for the printing machine.

The aim of the present invention is to provide a printing system that is capable of improving the background art in one or more of the aspects cited above.

Within this aim, an object of the invention is to provide a printing system that allows to optimize energy consumption and thus reduce printing costs.

Another object of the invention is to provide a printing system that allows to optimize ink drying so that printing speed can be increased, with the same energy consumption as the background art.

A further object of the invention is to provide a printing system that can offer the greatest assurances of reliability and safety in operation.

Another object of the invention is to provide a printing system that is constructively simple to provide.

A still further object of the present invention is to overcome the drawbacks of the background art in a manner that is alternative to any existing solutions.

Not least object of the invention is to provide a printing system that can be competitive also from a purely economic standpoint.

This aim, as well as these and other objects which will become better apparent hereinafter, are achieved by a printing system according to claim 1, optionally provided with one or more of the characteristics of the dependent claims.

Further characteristics and advantages of the invention will become better apparent from the description of preferred but not exclusive embodiments of the printing system according to the invention, illustrated by way of non-limiting example in the accompanying drawings, wherein.

Figure 1:
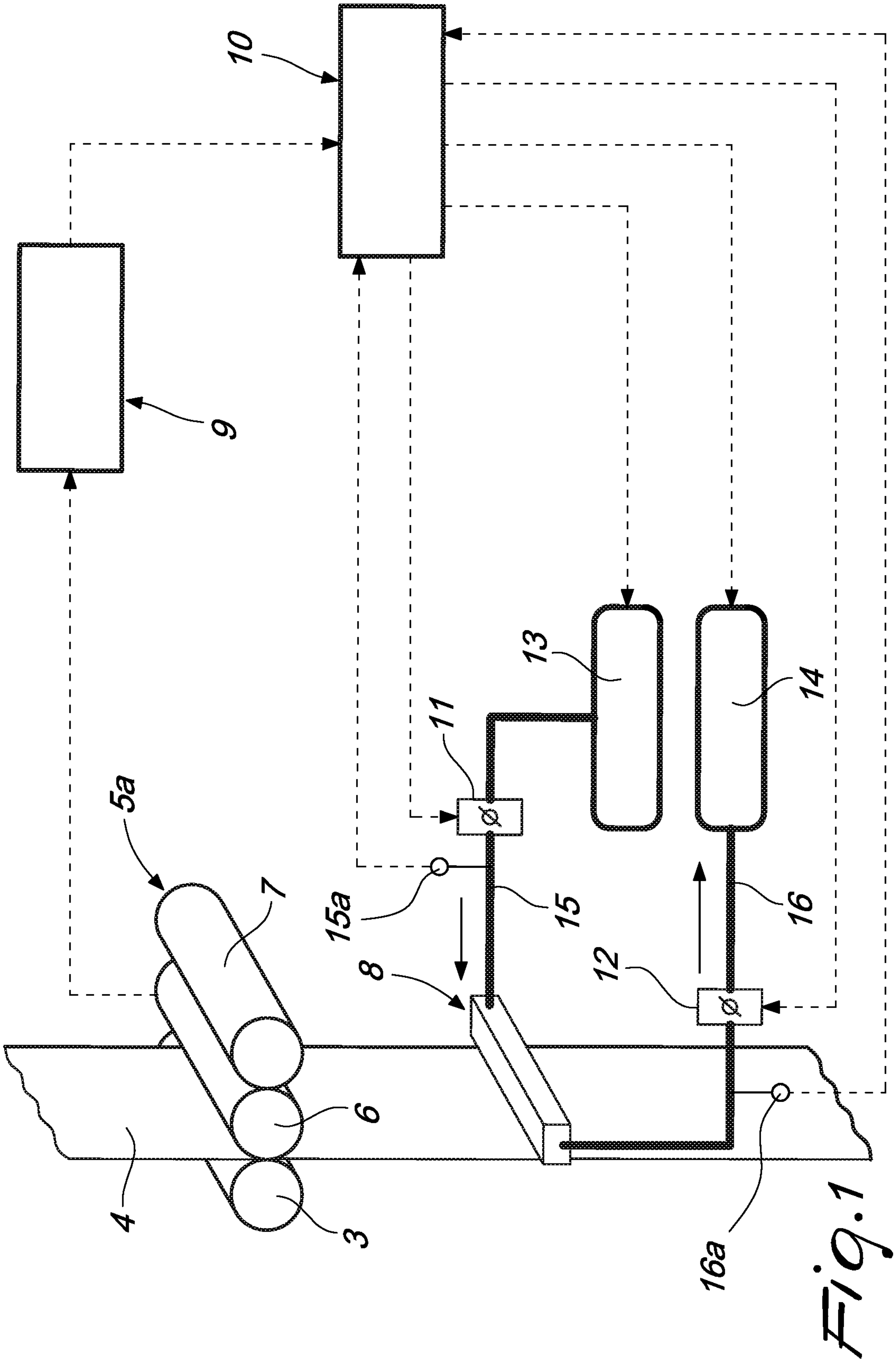
FIG. 1 is a schematic view of the system according to the invention.

With reference to the figures, the printing system according to the invention, generally designated by the reference numeral 1, comprises a flexographic printing machine 2, which has, on a supporting structure, at least one rotating impression cylinder 3 on which the material in sheet form 4 to be printed is wound.

At least one printing station 5*a*, intended to apply ink to the material in sheet form 4 to be printed, is arranged around the impression cylinder 3.

Figure 2:
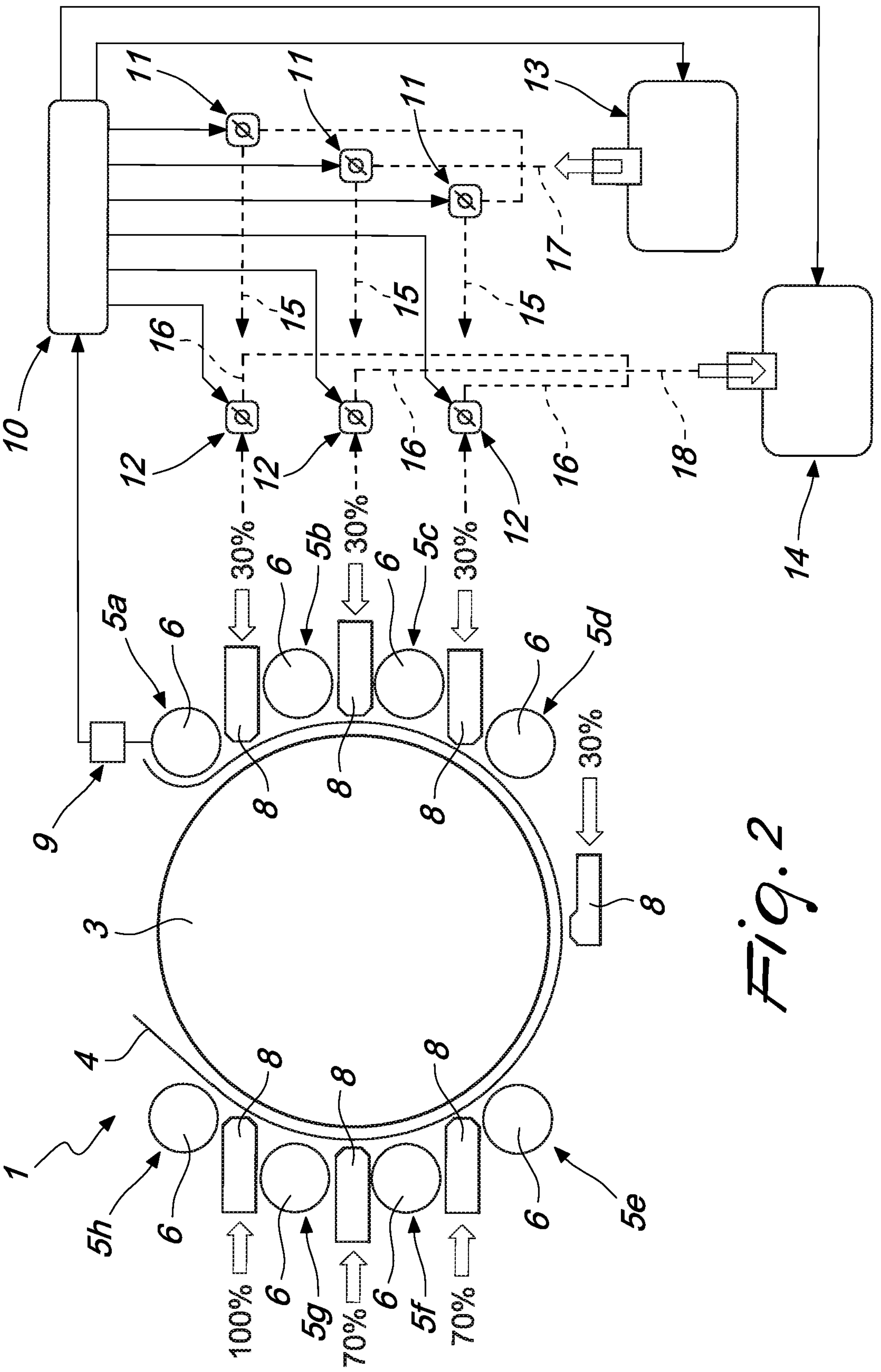
FIG. 2 is a different schematic view of the printing system according to the invention.

As in the example of FIG. 2, the printing machine may be provided with a single impression cylinder 2, around which multiple printing stations 5*a*-5*g* are arranged, each of which is intended to apply ink of a respective color to the material in sheet form 4 to be printed.

In particular, each of the printing stations 5*a*-5*g* comprises a respective plate cylinder 6, which can be positioned in contact with the material in sheet form 4 to be printed and is provided, on its lateral surface, with a respective graphic element.

The expression "graphic element" is understood as the raised printing region of the lateral surface of the plate cylinder 6 that allows to print a corresponding image on the material in sheet form 4.

Depending on the image to be printed, the graphic element on the plate cylinder 6 of each printing station may be the same or different from the one that is present on the plate cylinder 6 of the other printing stations 5*a*-5*g*.

Moreover, each printing station 5*a*-5*g* has a respective anilox roller 7, which is intended to transfer the ink onto the lateral surface of the plate roller 6.

Downstream of each of the printing stations 5*a*-5*g*, along the direction of advancement of the material in sheet form 4 to be printed, there is at least one respective unit 8 for drying the inks applied to the material in sheet form 4 to be printed by the corresponding printing station 5*a*-5*g*.

In particular, the drying unit 8 of each printing station 5*a*-5*g* is adapted to emit, in the direction of the material in sheet form 4 to be printed, at least one first air flow, preferably a hot air flow, i.e., air at a temperature conveniently comprised between room temperature and 120° C., so as to allow the at least partial drying of the inks applied by the corresponding printing station 5*a*-5*g*.

Moreover, the drying unit 8 of each printing station 5*a*-5*g* is adapted to extract at least one second air flow from the material in sheet form 4, so as to ensure the evacuation of the solvents, in the case of solvent-based inks, and moisture, if water-based inks are used, from the printing stations, creating a region at negative pressure, with respect to atmospheric pressure, adjacent to the material in sheet form 4.

Advantageously, the drying unit 8 of each printing station 5*a*-5*g* is constituted by a drying box, which extends transversely with respect to the advancement direction of the material in sheet form 4 and is provided with at least one delivery opening, for the emission of the first air flow in the direction of the material in sheet form 4, and with at least one extraction opening, for the extraction of the second air flow from the material in sheet form 4.

Optionally, downstream of the printing stations 5*a*-5*g*, it is possible to provide a last printing station 5*h*, along the direction of advancement of the material in sheet form 4 to be printed around the impression cylinder 3, which is provided, like the others, with its own plate cylinder 6 and its own anilox roller 7 but lacks its own drying unit 8, since downstream of said station and at the exit of the impression cylinder 3 there is a drying tunnel, not shown, which is intended to provide the final drying of the inks applied by the various printing stations 5*a*-5*g* to the material in sheet form 4.

The peculiarity of the invention resides in that it comprises acquisition means 9 capable of acquiring a coverage value of the graphic element present on the plate cylinder 6 of each printing station 5*a*-5*g* and means for automatically adjusting the flow rate of the first air flow emitted by the drying unit 8 of each printing station 5*a*-5*g* and the flow rate of the second air flow extracted from the drying unit 8 of each printing station 5*a*-5*g* on the basis of the coverage value of the graphic element acquired by the acquisition means 9.

The term coverage refers to the percentage of the surface of the material in sheet form 4 to be printed that is covered by the inks transferred onto such surface of the material in sheet form 4 by the graphic element that is present on the plate cylinder of the printing stations 5*a*-5*g*.

In more detail, the acquisition means 9 are functionally connected to control means 10, which are conveniently constituted by an electronic processing unit, while respective means for delivering the first air flow and respective means for extracting the second air flow are conveniently associated with each drying unit 8.

In particular, the control means 10 are configured to drive the delivery means and the extraction means of each drying unit 8 according to the coverage value of the graphic element acquired by the acquisition means 9.

Advantageously, the delivery means of each drying unit 8 comprise respective first valve means 11, which allow control of the first air flow and are connected to at least one air delivery fan 13, and respective second valve means 12, which in turn allow to control the second air flow and are connected to at least one air extraction fan 14.

In particular, the first valve means 11 of each drying unit 8 are interposed along a respective air delivery line 15, while the second valve means 12 of each drying unit 8 are interposed along a respective extraction line 16.

Conveniently, the delivery lines 15 of the drying units 8 can be supplied by a single air delivery fan 13 which is shared by all the drying units 8, to which they are connected by means of a general air delivery manifold 17, while the extraction lines 16 of the drying units 8 are connected to a single air extraction fan 14 shared by all the drying units 8 via a general air extraction manifold 18.

Advantageously, the control means 10 are configured to drive the first valve means 11 and second valve means 12 of each drying unit 8.

More particularly, the control means 10 are for example configured to vary the extent of the opening of the first valve means 11 and of the second valve means 12 of each drying unit 8 so that the flow rate of the first air flow is proportional to the coverage value of the graphic element acquired by the acquisition means 9 for the plate cylinder 6 of the corresponding printing station 5*a*-5*g*, and so that the flow rate of the second air flow is in turn proportional to the flow rate of the first air flow of the corresponding drying unit 8, so as to ensure the correct drying of the inks, without wasting energy, and ensure, at the same time, the creation of a negative pressure at the printing stations 5*a*-5*g* that avoids the dispersion of the evaporated solvents, if solvent-based inks are used, or allows the removal of the evaporated water, if water-based inks are used.

Conveniently, the first valve means 11 and the second valve means 12 comprise at least one respective gate valve having a flow control element capable of assuming a plurality of intermediate positions between a fully closed position and a fully open position, so as to allow to vary adjustably their degree of opening.

Preferably, the flow control element of the first valve means 11 and of the second valve means 12 can be actuated by an electric motor, for example of the step type, which is driven by the control means 10, to allow the controlled positioning of said flow control element on the basis of the data acquired by the acquisition means 9.

Conveniently, the control means 10 can be configured to drive the delivery fan 13 and the extraction fan 14 and, more particularly, can be configured to vary the rotation rate of the delivery fan 13 and of the extraction fan 14 on the basis of the data acquired by the acquisition means 9.

Advantageously, in order to allow the control means 10 to monitor the operation of each drying unit 8, pressure sensors 15*a*, 16*a*, functionally connected to the control means 10, may be provided along the air delivery line 15 and along the extraction line 16 of each drying unit 8.

Moreover, pressure sensing means connected to the control means 10 can also be provided along the general air delivery manifold 17 and along the general air extraction manifold 18.

According to one possible embodiment, the acquisition means 9 may comprise means for detecting the graphic element that is present on the plate cylinder 6 of each printing station 5*a*-5*g*.

Figure 3:
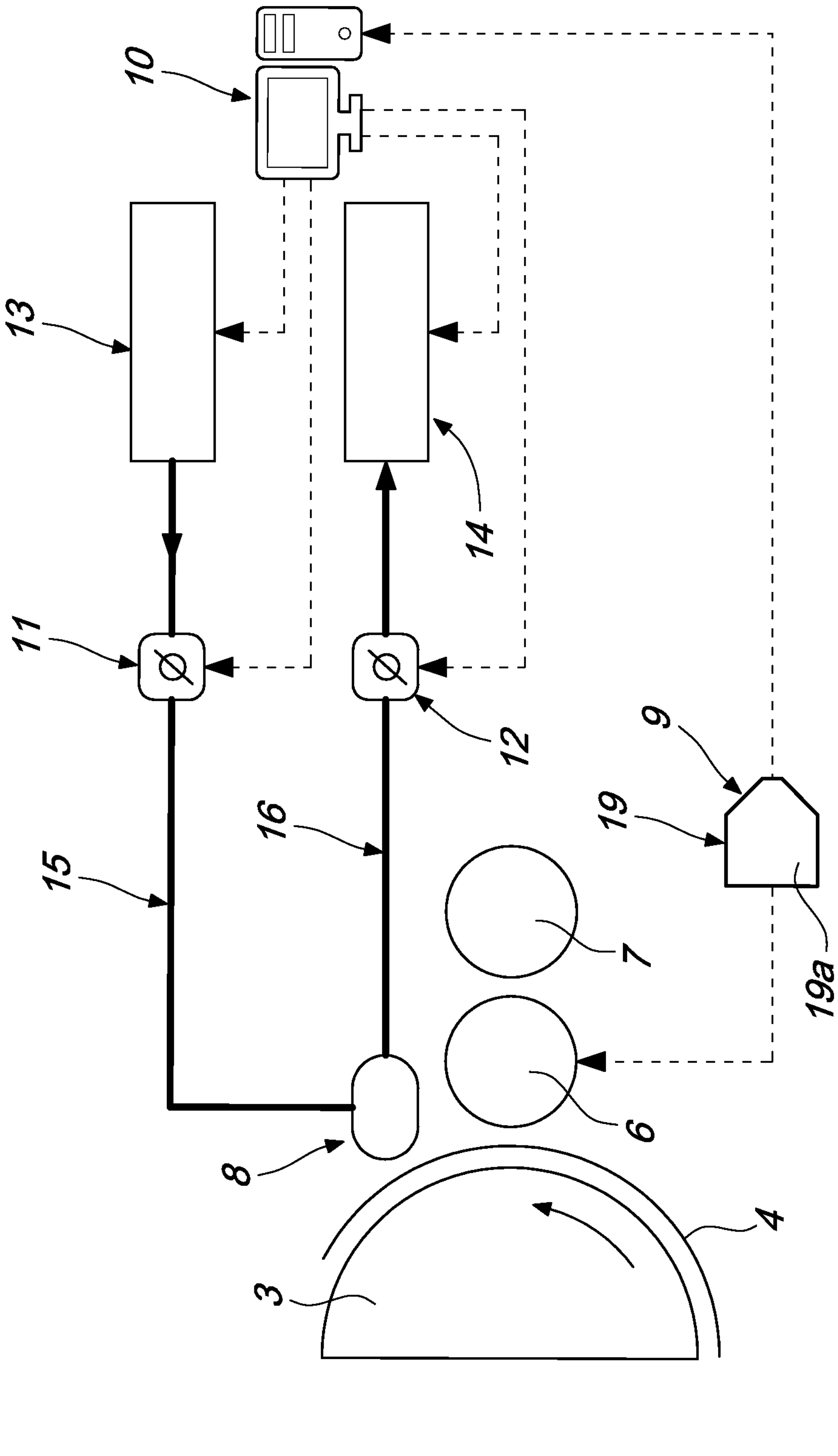
FIG. 3 is a schematic view of the system according to the invention with data acquisition means in a first embodiment.

Advantageously, as in the embodiment of FIG. 3, the graphic element detection means comprise video camera means 19 which are configured to detect the graphic element present on the plate cylinder 6 of each printing station 5*a*-5*g* and calculate the coverage value of the graphic element.

More particularly, the video camera means 19 are configured to detect the extension of the printing region formed on the lateral surface of the plate cylinder 6 of each printing station 5*a*-5*g* with respect to the extension of the entire lateral surface of said plate cylinder.

In this way, the video camera means 19 can calculate, in percentage terms, the value of the extension of the printing region of the plate cylinder 6 in relation to the total extension of the lateral surface of said plate cylinder, and on the basis of the calculated percentage value they can determine the coverage value of the graphic element, again in percentage terms, in relation to the entire surface of the portion of the material in sheet form that passes through the corresponding printing station 5*a*-5*g*, at each turn of the plate cylinder 6.

Conveniently, the video camera 19 means comprise, for each printing station 5*a*-5*g*, a respective video camera 19*a* arranged so as to detect the graphic element of the plate cylinder 6 of the corresponding printing station 5*a*-5*g*.

Figure 4:
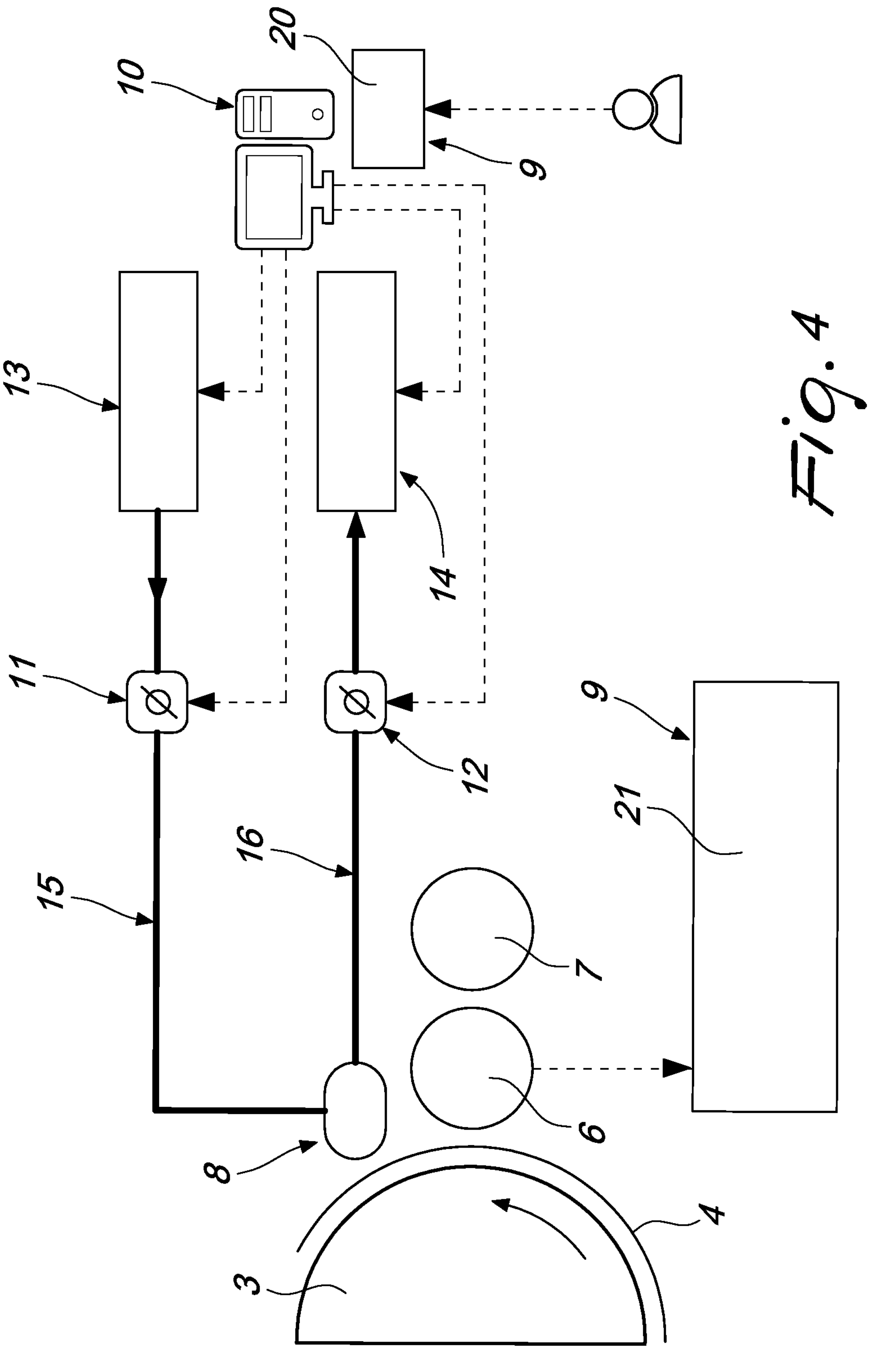
FIG. 4 is a schematic view of a second embodiment of the data acquisition means of the system according to the invention.

According to a different embodiment, shown schematically in FIG. 4, the acquisition means 9 can comprise user interface means 20 to allow the operator to input data and in particular data related to the coverage of the graphic element.

For example, the user interface means 20 may be constituted by a keyboard, a touchscreen panel, a peripheral for reading data storage devices, or by other similar apparatuses.

In this case, the percentage value of the coverage of the graphic element is calculated by means of a graphic processing of the image to be printed, conveniently performed by using a processing device 21, and this data item can be set manually by the operator, before printing operations begin, via the user interface means 20.

As an alternative, the percentage value of the coverage of the graphic element can be obtained, separately from the machine, by means of an adapted video camera system capable of scanning the lateral surface of the plate cylinder of each printing station before the plate cylinder is placed in the machine.

Figure 5:
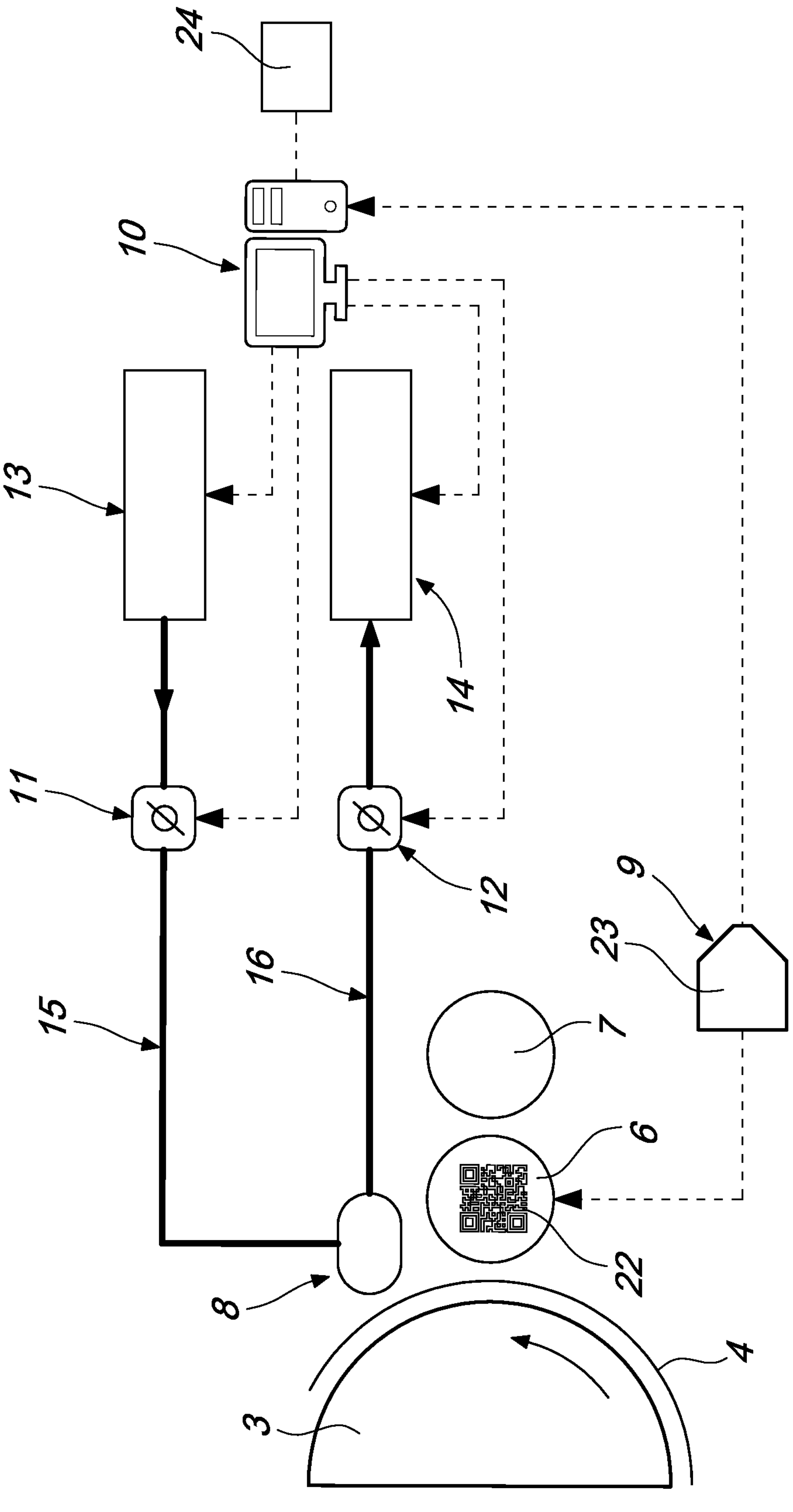
FIG. 5 is a schematic view of a third embodiment of the data acquisition means of the system according to the invention.

With reference to FIG. 5, according to a third embodiment, a respective recognition marker 22 comprising a unique identification code of the corresponding plate cylinder 6 is associated with the plate cylinder 6 of each printing station 5*a*-5*g*.

Such recognition marker 22 can be, for example, a bar code, a QR code, or the like.

In this case, the acquisition means 9 comprise means 23 for reading the recognition marker 22 applied to the plate cylinder 6 of each printing station 5*a*-5*g*, while the control means 10 are functionally connected to a memory 24 in which data records related to the plate cylinders 6 that are mounted on the machine are stored.

In particular, the identification code comprised in the recognition marker 22 of each plate cylinder 6 corresponds to a respective record stored in the memory 24, which contains the coverage value of the graphic element present on the plate cylinder 6 that corresponds to said identification code.

In this way, once the identification code of the plate cylinder 6 has been detected by means of the reading of the recognition marker 22 by the reading means 23, the control means 10 are able to acquire, from the record associated with the detected identification code, the data of the graphic element related to the plate cylinder 6 to which the read recognition marker 22 is applied.

Figure 6:
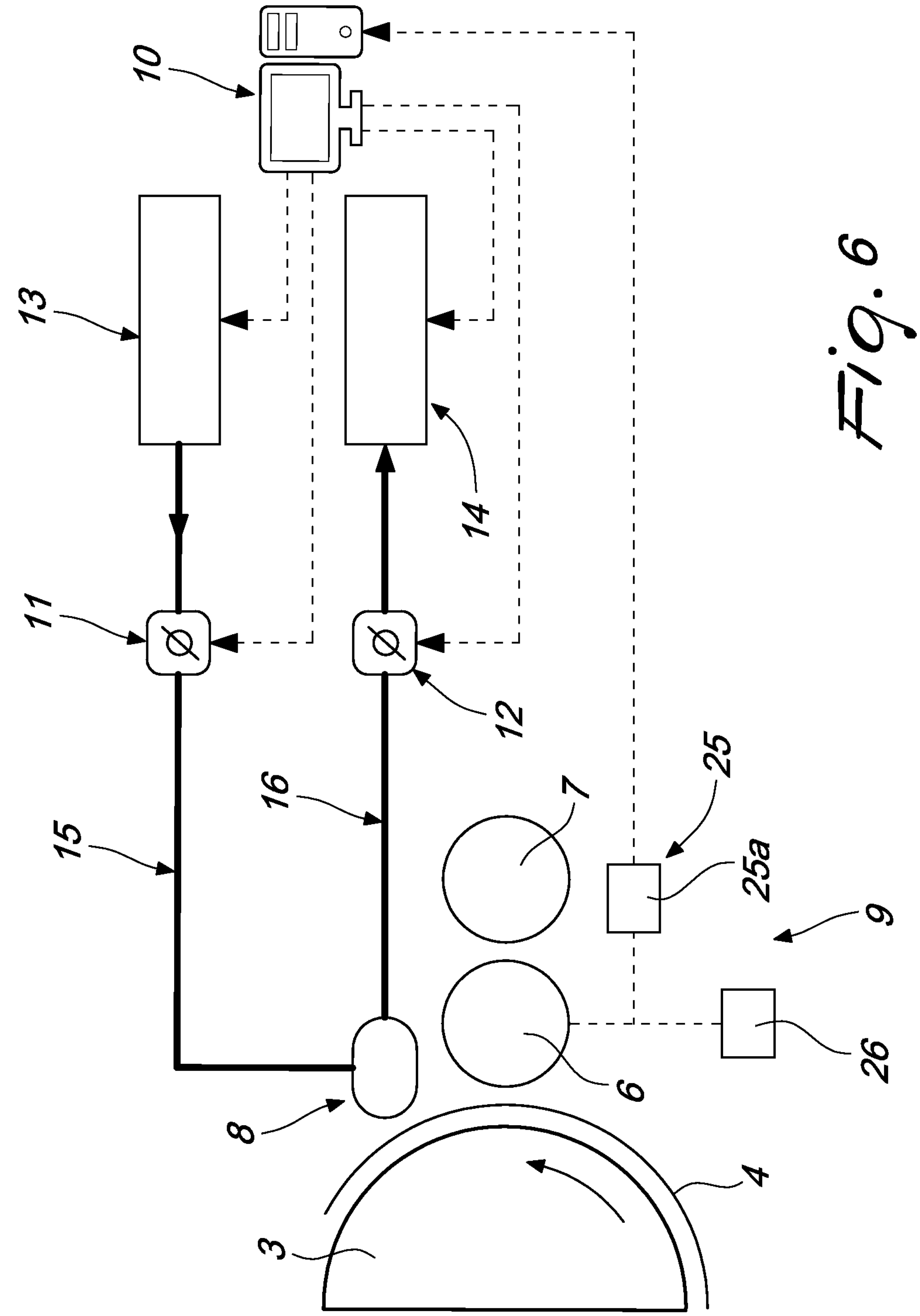
FIG. 6 is a schematic view of the data acquisition means of the system according to the invention in a fourth embodiment.

According to a fourth embodiment, shown in FIG. 6, the acquisition means 9 comprise means 25 for measuring the electric current drawn by the motor that drives the plate cylinder 6 of each printing station 5*a*-5*g*.

In this case, the control means 10 are configured to compare the values of the electric current measured by the measurement means 25 with respect to at least one reference value and to determine, on the basis of the comparison, the coverage value of the graphic element present on the plate cylinder 6 of each printing station 5*a*-5*g*.

In particular, the measurement means 25 comprise, for each printing station 5*a*-5*g*, a respective detector 25*a* of the current absorbed by the motor of the corresponding plate cylinder 6, with the plate cylinder 6 in contact with the impression cylinder 3 at a preset pressure, and at least one encoder 26 capable of detecting the angular position of the corresponding plate cylinder 6.

By means of the measurements provided by each detector 25*a* and each encoder 26, with the plate cylinder 6 placed in contact with the impression cylinder 3 at a preset contact pressure, the control means 10 are able to determine, for the plate cylinder 6 of each printing station 5*a*-5*g*, the trend of the electric current absorbed by the corresponding motor, at each full turn of the plate cylinder 6, and to determine the coverage, in percentage terms, of the graphic element present on the plate cylinder 6 of each printing station 5*a*-5*g*, by comparing the detected trend of the electric current absorbed by the corresponding motor with the trend, calculated theoretically or measured experimentally once and for all, that the electric current absorbed by the motor would have in the case of a comparison plate cylinder provided with a graphic element constituted by a printing region extending over the entire lateral surface of the plate cylinder.

The difference between the trend of the electric current drawn by the motor of the plate cylinder 6 of each printing station 5*a*-5*g* and the trend of the electric current drawn by the motor in the case of a comparison plate cylinder allows the control means 10 to determine the percentage value of the coverage of the graphic element present on the plate cylinder of each printing station 5a-5g.

It should be noted that prior to the detections performed with the plate rollers 6 in contact with the impression cylinder 3, measurements are conveniently performed by means of the detectors 25a and the encoders 26 of the current drawn by the motor of the plate rollers 6 at no load, i.e., with the plate rollers 6 not in contact with the impression cylinder 3.

The operation of the printing system, according to the invention, is as follows.

Before starting each new printing job on the printing machine 2, the value of the coverage of the graphic element present on the plate cylinder 6 that is mounted on each printing station 5a-5g is acquired via the acquisition means 9 on the basis of the image to be printed.

As a function of the acquired value of the coverage of the graphic element present on the plate cylinder of each printing station 5a-5g, the control means 10 adjust, preferably proportionally, the degree of opening of the first valve means 11 associated with the drying unit 8 of each printing station 5a-5g, so as to adjust accordingly the flow rate of the air flow emitted by the drying units 8.

Moreover, the control means 10 also adjust, in proportion to the adjustment performed on the corresponding first valve means 11, the degree of opening of the second valve means 12 associated with the drying unit 8 of each printing station 5a-5g, so as to obtain the correct adjustment also of the flow rate of the air flow drawn in by the drying unit 8 of each printing station 5a-5g, so as to ensure the presence of an adequate negative pressure, with respect to atmospheric pressure, at the printing stations 5a-5g.

By way of example, if the value of the coverage of the graphic element present on the plate cylinder 6 of a printing station 5a-5g acquired by the acquisition means 9 is 70% in percentage terms, the control means 10 automatically adjust the first valve means 11 associated with the drying unit 8 that corresponds to the printing station 5a-5g for which the graphic element coverage value was acquired, so that the degree of opening of the first valve means 11 is 70% of the total, where the 100% degree of opening corresponds to the complete opening of the first valve means 11.

With reference, again by way of example, to the situation shown in FIG. 2, if a graphic element coverage value of 30% for the plate cylinder 6 of the printing stations 5a, 5b 5c, 5d and of 70% for the plate cylinder 6 of printing stations 5f and 5g is acquired by the acquisition means 9, the first valve means 11 associated with the printing stations 5a, 5b, 5c, 5d may be adjusted by the control means 10 so that the flow rate of the air flow emitted by the corresponding delivery units is substantially equal to 30% of the maximum flow deliverable by the drying units 8, while the corresponding first valve means 11 for the printing stations 5f and 5g may be adjusted by the control means 10 so that the air flow emitted by the corresponding delivery units is substantially equal to 70% of the maximum flow deliverable by the drying units 8.

Again with reference to the example of FIG. 2, if, finally, the acquisition means 9 acquire a graphic element coverage value of 100% for the plate cylinder 6 of the printing station 5g, a situation that corresponds to that of a plate cylinder provided with a printing region that extends over its entire lateral surface, the first valve means 11 of the drying unit 8 of the printing station 5g are adjusted by the control means 10 so that the flow rate of the air flow emitted by the delivery unit of the printing station 5g is 100%, i.e., equal to the maximum flow rate that can be delivered by the delivery units 8.

The control means 10, again on the basis of the data acquired by the acquisition means 9, can also adjust the speed of the delivery fan 13 and of the extraction fan 14.

Once the first valve means 11 of the drying unit 8 of each printing station 5a-5g have thus been adjusted, the control means 10 also adjust the second valve means 12 of the drying unit 8 of each printing station 5a-5g.

In particular, the control means 10 adjust the second valve means 12 of the drying unit 8 of each printing station 5a-5g so that it is proportional to the adjustment of the corresponding first valve means 11.

In addition to the adjustment of the first valve means 11 and of the second valve means 12, the control means 10 also adjust if necessary the speed of the delivery fan 13 and of the extraction fan 14, again on the basis of the data acquired by the acquisition means 9.

Once the above described adjustments are finished, the new printing job is started.

In practice it has been found that the invention achieves the intended aim and objects.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Italian Patent Application No. 102022000019905 from which this application claims priority are incorporated herein by reference.

What is claimed is:

1. A printing system comprising a flexographic printing machine comprising at least one impression cylinder, on which a material in sheet form to be printed is wound and around which at least one printing station is arranged which comprises:

a respective plate cylinder, which can be positioned in contact with the material in sheet form to be printed and bears, on a lateral surface thereof, a respective graphic element, and a respective anilox roller, designed to transfer ink onto the lateral surface of the plate cylinder, downstream of said at least one printing station, along a direction of advancement of the material in sheet form to be printed, there being at least one respective drying unit for the inks applied to the material in sheet form to be printed, said drying unit being adapted to emit at least one first air flow in a direction of the material in sheet form and to aspirate at least one second air flow from the material in sheet form, further comprising acquisition means for acquiring a coverage value of the graphic element present on the plate cylinder of said at least one printing station and means for automatically adjusting a flow rate of said first air flow and of said second air flow as a function of a coverage value of the graphic element acquired by said acquisition means, and control means functionally connected to said acquisition means, respective delivery means for delivering said first air flow and respective means for extracting said second air flow being associated with each drying unit, said control means being configured to drive said delivery means and said extraction means as a function of the coverage value of the graphic element acquired by said acquisition means, wherein the acquisition means comprise measurement means for measuring the electric current absorbed by the motor that drives the plate cylinder of each printing station, the control means being configured to compare values of the electric current measured by the measurement means with respect to at least one reference value and to determine, based on said comparison, the coverage value of the graphic element present on the plate cylinder of each printing station.

2. The system according to claim 1, wherein said printing machine comprises a plurality of printing stations arranged around said impression cylinder, downstream of each printing station there being at least one respective drying unit for the inks, said automatic adjustment means being configured to automatically adjust the flow rate of said first air flow and of said second air flow of each drying unit as a function of the coverage value of the graphic element acquired by said acquisition means for the plate cylinder of the corresponding printing station.

3. The system according to claim 1, wherein said delivery means comprise, for each drying unit, first valve means adapted to control said first air flow and second valve means adapted to control said second air flow, said first valve means being connected to at least one air delivery fan, said second valve means being connected to at least one air extraction fan.

4. The system according to claim 3, wherein said control means are configured to drive said first valve means and said second valve means.

5. The system according to claim 3, wherein said control means are configured to drive said at least one air delivery fan and said at least one air extraction fan.

6. The system according to claim 1, wherein said acquisition means comprise means for detecting the graphic element present on the plate cylinder of each printing station.

7. The system according to claim 6, wherein the graphic element detection means comprise video camera means configured to detect the graphic element present on the plate cylinder of each printing station, and to calculate the coverage value of the graphic element.

8. The system according to claim 7, wherein the video camera means are configured to detect the extent of the printing region defined on the lateral surface of the plate cylinder of each printing station with respect to the extent of the entire lateral surface of the plate cylinder.

9. The system according to claim 1, wherein the acquisition means comprise user interface means for data input by an operator.

10. The system according to claim 1, wherein a respective recognition marker comprising an identification code is associated with the plate cylinder of each printing station, the acquisition means comprising means for reading the recognition marker applied to the plate cylinder of each printing station, the control means being functionally connected to a memory, said identification code corresponding to a record stored in said memory and containing the coverage value of the graphic element present on the plate cylinder that corresponds to the identification code.

11. The system according to claim 1, wherein each drying unit comprises at least one respective air delivery line and at least one respective air extraction line, along the air delivery line and along the air extraction line of each drying unit there being pressure sensors functionally connected to said control means.

* * * * *